(12) United States Patent
Morovic et al.

(10) Patent No.: US 10,569,527 B2
(45) Date of Patent: Feb. 25, 2020

(54) THREE-DIMENSIONAL OBJECT PRESENTATION

(71) Applicant: Hewlett-Packard Development Company, L.P., Houston, TX (US)

(72) Inventors: Peter Morovic, Sant Cugat del Valles (ES); Jan Morovic, Colchester (GB); Scott White, Barcelona (ES); Jun Zeng, Sunnyvale, CA (US); Juan Manuel Garcia Reyero Vinas, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 196 days.

(21) Appl. No.: 15/544,510

(22) PCT Filed: Apr. 24, 2015

(86) PCT No.: PCT/US2015/027521
§ 371 (c)(1),
(2) Date: Jul. 18, 2017

(87) PCT Pub. No.: WO2016/171717
PCT Pub. Date: Oct. 27, 2016

(65) Prior Publication Data
US 2018/0099496 A1 Apr. 12, 2018

(51) Int. Cl.
*B33Y 50/02* (2015.01)
*G06T 17/00* (2006.01)
(Continued)

(52) U.S. Cl.
CPC .............. *B33Y 50/02* (2014.12); *G06T 9/001* (2013.01); *G06T 15/10* (2013.01); *G06T 17/00* (2013.01); *G06T 19/20* (2013.01); *B33Y 50/00* (2014.12)

(58) Field of Classification Search
None
See application file for complete search history.

(56) References Cited

U.S. PATENT DOCUMENTS

| 8,831,366 B1 | 9/2014 | Hickman et al. |
| 2003/0117403 A1 | 6/2003 | Park et al. |
| (Continued) | | |

FOREIGN PATENT DOCUMENTS

WO    WO-2014/172687 A2    10/2014

OTHER PUBLICATIONS

International Search Report and Written Opinion dated Feb. 24, 2016, PCT Patent Application No. PCT/US2015/027521, filed Apr. 24, 2015, Korean Intellectual Property Office.
(Continued)

*Primary Examiner* — Fayyaz Alam
(74) *Attorney, Agent, or Firm* — HP Inc. Patent Department

(57) ABSTRACT

Methods and apparatus for three-dimensional object representation are described. In an example, data representing a three-dimensional object is received, the data comprising an object property description associated with each of a plurality of locations within the object. Distinct object property descriptions are identified and a data object, which has a plurality of addresses, is populated with data indicative of the distinct object property descriptions, such that data indicative of each distinct object property description is represented at a different address. Data comprising a representation of the object is generated, the data comprising a data object address associated with each of a plurality of locations, wherein the data object address corresponds to the address of data indicative of the object property description for that location.

15 Claims, 4 Drawing Sheets

(51) Int. Cl.
*G06T 9/00* (2006.01)
*G06T 15/10* (2011.01)
*G06T 19/20* (2011.01)
*B33Y 50/00* (2015.01)

(56) References Cited

U.S. PATENT DOCUMENTS

| | | |
|---|---|---|
| 2011/0222081 A1 | 9/2011 | Yi et al. |
| 2013/0073068 A1 | 3/2013 | Napadensky |
| 2014/0265034 A1 | 9/2014 | Dudley |
| 2014/0265035 A1* | 9/2014 | Buser .................. B29C 67/0088 264/401 |
| 2014/0301179 A1 | 10/2014 | Rich et al. |
| 2014/0324204 A1* | 10/2014 | Vidimce ............. B29C 67/0088 700/98 |
| 2014/0330421 A1* | 11/2014 | Wu ........................ G06T 17/00 700/119 |
| 2016/0067927 A1* | 3/2016 | Voris ...................... B33Y 50/02 700/98 |
| 2017/0372513 A1* | 12/2017 | Zeng ....................... G06T 19/00 |

OTHER PUBLICATIONS

Jackson, et al., "Modeling and designing functionally graded material components for fabrication with local composition control", Materials and Design vol. 20, 1999, pp. 63-75.

\* cited by examiner

THREE-DIMENSIONAL OBJECT PRESENTATION

CLAIM FOR PRIORITY

The present application is a national stage filing under 35 U.S.C. § 371 of PCT application number PCT/US2015/027521, having an international filing date of Apr. 24, 2015, the disclosure of which is hereby incorporated by reference in its entirety.

BACKGROUND

Three-dimensional objects generated by an additive manufacturing process may be formed in a layer-by-layer manner. In one example of additive manufacturing, an object is generated by solidifying portions of layers of build material. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three-dimensional objects may be generated by using extruded plastics or sprayed materials as build materials, which solidify to form an object.

Some printing processes that generate three-dimensional objects use control data generated from a model of a three-dimensional object. This control data may, for example, specify the locations at which to apply an agent to the build material, or where a build material itself may be placed, and the amounts to be placed. The control data may be generated from a 3D representation of an object to be printed.

BRIEF DESCRIPTION OF DRAWINGS

For a more complete understanding, reference is now made to the following description taken in conjunction with the accompanying drawings in which.

DETAILED DESCRIPTION

Figure 1:
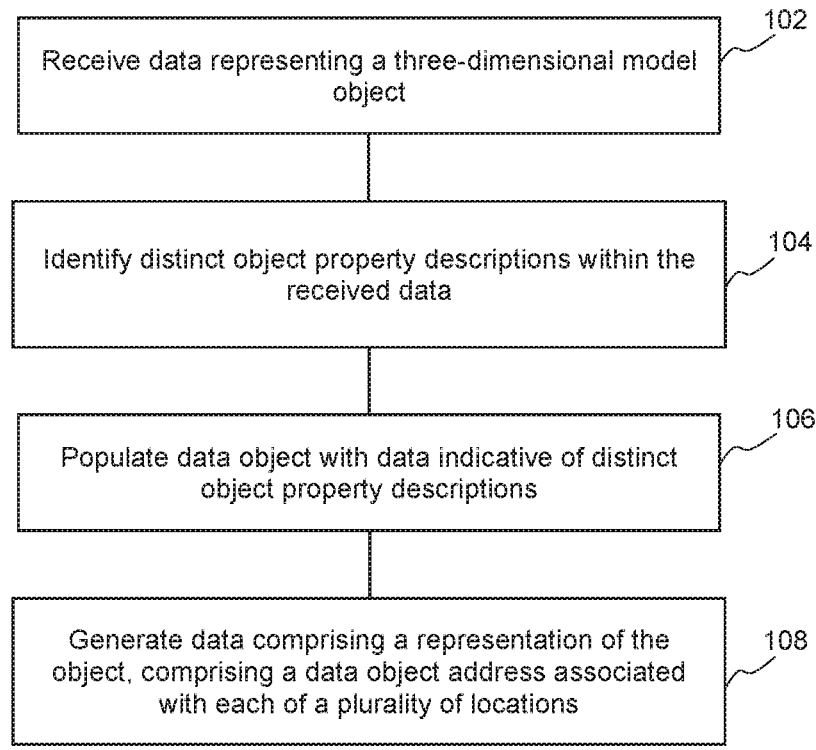
FIG. 1 is a flowchart of an example of a method for processing a representation of an object.

Some examples described herein provide an apparatus and a method for representing a three dimensional object and/or for generating control data that may be used to produce a three dimensional object. Some examples allow arbitrary three dimensional content with a variety of specified object properties to be processed and used to generate a three-dimensional object. These object properties may comprise appearance properties (color, transparency, glossiness, etc), conductivity, density, porosity and/or mechanical properties such as strength.

In some examples herein, three-dimensional space is characterised in terms of 'voxels', i.e. three-dimensional pixels, wherein each voxel occupies a discrete volume. In data modelling a three dimensional object, a voxel at a given location may have at least one characteristic. For example, it may be empty, or may have a particular color or may represent a particular material, or a particular object property, or the like. The voxels of an object may have the same shape (for example, cubic or tetrahedral), or may differ in shape and/or size.

In some examples, a print material coverage representation defines print material data, for example detailing the amount of print materials (such as agent(s) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provide an object property such as, for example, color, transparency, flexibility, elasticity, rigidity, surface roughness, porosity, conductivity, inter-layer strength, density, and the like.

The actual location at which each print material (for example, a drop of an agent) should be applied, as specified in control data, may be determined using halftoning techniques.

For example, a set of voxels within object model data may have an associated print material coverage representation comprising a set of print material volume coverage vectors (Mvoc). In a simple case, such a vector may indicate that X % of a given region of three-dimensional space should have a particular agent applied thereto, whereas (100−X) % should be left clear of agent. This may define a probability distribution for a given material. In some examples, the material coverage representation may comprise a description of the coverage of a particular material. The print material coverage representation may then provide the input for a 'halftoning' process to generate control data that may be used by an additive manufacturing system to produce a three-dimensional object. For example, it may be determined that, to produce specified object properties, 25% of a layer of build material (or of a portion of a layer) should have an agent applied thereto. The halftoning process determines where the drops of agent fall in order to provide 25% coverage, for example by comparing each location to a threshold value provided in a halftone threshold matrix.

FIG. 1 is an example of a method for transforming a representation of a data object. In block 102, data representing a three-dimensional object is received, the data comprising an object property description associated with each of a plurality of locations within the object. The data may for example be the output of a Computer Aided Design (CAD) program, or some other digital representation of a three dimensional object.

In some examples, the locations may comprise point locations, for example [x,y,z] coordinates defining a point in space. In other examples, the locations may comprise regions, for example voxels, as described above. In other examples, other volumetric descriptions may be used to define a location. In some examples, the locations may be defined in a geometric model of the object.

Figure 2:
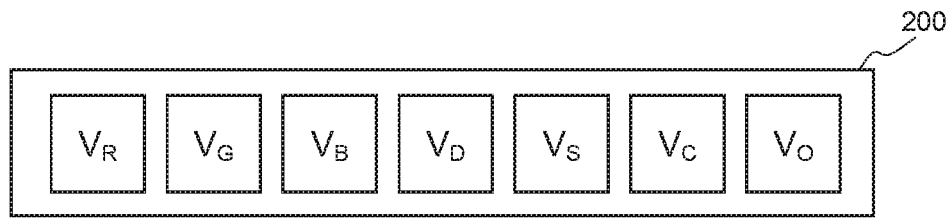
FIG. 2 is a schematic representation of an example of an object property description.

The object property description may describe any property attributed to the object represented by the data, such as appearance properties (color, transparency, glossiness, etc), conductivity, density, porosity and/or mechanical properties such as strength. For the purpose of example, the object property description may be a data object 200 such as is shown schematically in FIG. 2. In this example, the set of properties comprises three color values $V_R$, $V_G$, $V_B$, representing Red, Green and Blue color values, a Density value $V_D$, a stiffness value $V_S$, a conductivity value $V_c$ and an opacity value $V_O$. Other sets of object properties may be described, and may comprise any of the properties mentioned above as well as any of, amongst others: flexibility; elasticity; rigidity; surface roughness; porosity; strength, or the like.

In some examples, a value set is predetermined for each property and the value is taken from the set. For example, a bit depth may be specified for each property. For the set of values shown in FIG. 2, the bit depth may for example be specified as [8, 8, 8, 5, 4, 1, 6], i.e. the color values are specified with 8 bit resolution, 5 bits (32 level resolution) for the density values, 4 bits (16 level resolution) for stiffness values, 1 bit (on/off) for conductivity, and 6 bits (64 level resolution) for opacity. This would result in a 5-byte encoding of the seven property data object.

However, in other examples, the object property description could take any form, including an instruction for a particular combination of materials/agents to be used in fabricating an object having a property or properties. In examples in which a location represents a region of the object, the object property description may comprise an indication of at least one object property which varies within the region. For example, instead of being an indication of a single property, it could comprise an indication of a spatial function or variation of a property, such as a property gradient or the like.

In block 104, distinct object property descriptions (in some examples, all distinct object properties) within the received data are identified, and, in block 106, a data object having a plurality of addresses (for example, memory addresses) is populated with data indicative of the distinct object property descriptions, such that data indicative of each distinct object property description is represented by a different address.

Not all possible properties, and not all possible combinations of properties, are likely to be seen in any given object. If all the property combinations were to be considered, the memory space taken up would be very large. Taking the bit depth examples set out above, for color description in an RGB domain at 8-bits the total possible address space is $256^3$. Adding two additional 8-bit encoded properties, such as for example structure and opacity, would result in an address space of $256^5$ (i.e. $\sim 10^{12}$). However, for a given object, this space is likely to be sparsely populated. Therefore, instead of indexing such a large address space, a three dimensional object may be represented by associating discrete object property descriptions with each described location. However, this is also inefficient, as some locations may have the same object description. In addition, an object may use a large range of values for one property, but a small range (or be entirely homogenous) with respect to another (for example there may be a range of colors, but all at the same opacity).

Therefore, by populating a data object (which may be database, held in a memory of the like), with distinct object property descriptions (i.e. not including repeated items as separate entries), each stored at a different address, the address space taken up is sized for the object under consideration, which takes up less memory space than the entire set of possible object property descriptions.

Further, in some examples, not all distinct object property descriptions are stored explicitly in the data object. For example, as explained in greater detail below, a subset of object property descriptions may be determined and stored, while intermediate values may discarded, for example if these can be re-computed using interpolation.

In some examples, the data object may be populated with at least a subset of the received object property descriptions. In other examples, the data object may be populated with other data indicative of the object property descriptions, for example data indicating one or a combination of materials or agents for use in fabricating an object having those qualities (for example, a print material coverage representation, specifying a volume of print material to be applied), or a mapping representing at least one transformation to be applied to discover a suitable print material coverage representation, or the like.

In block 108, data comprising a (new) representation of an object is generated. This data comprises a data object address associated with each of a plurality of locations (which may be the same as the locations for which object property descriptions were provided), wherein the data object address corresponds to the address of the data indicative of object property description for that location.

Within this data, it may be that a plurality of object locations are associated with the same data object address, for example if the locations share object properties. This may further reduce the memory space taken up.

In some examples, it may be that object locations should be considered together. For example, there may be a particular gradient of an object property—e.g. an object may be intended to have a smooth color change, or to increase in opacity gradually in at least a region thereof. Where an object property description could result in a plurality of print material coverage representations, for example, it may be specified that a consistent mapping is used across this region. Therefore, in some examples, generating the new representation of the object may comprise determining an association between the data indicative of object property descriptions for a plurality of locations, and storing this association, for example in the data object or in the generated representation of the object. In some examples, this association may then be used when determining a mapping to print material data.

Figure 3:
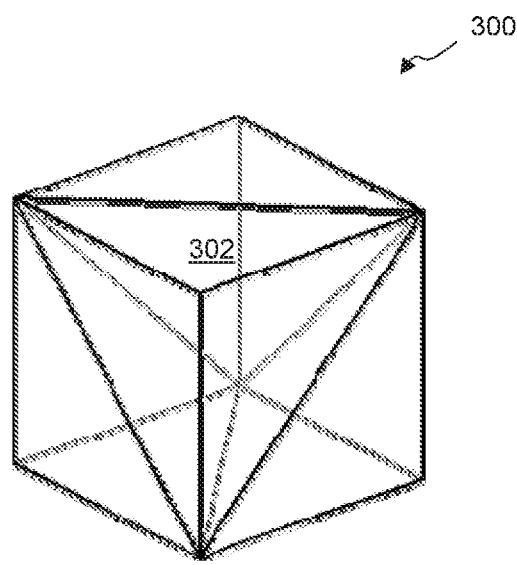
FIGS. 3 and 4 are schematic representations of examples of object property volumes.
Figure 4:
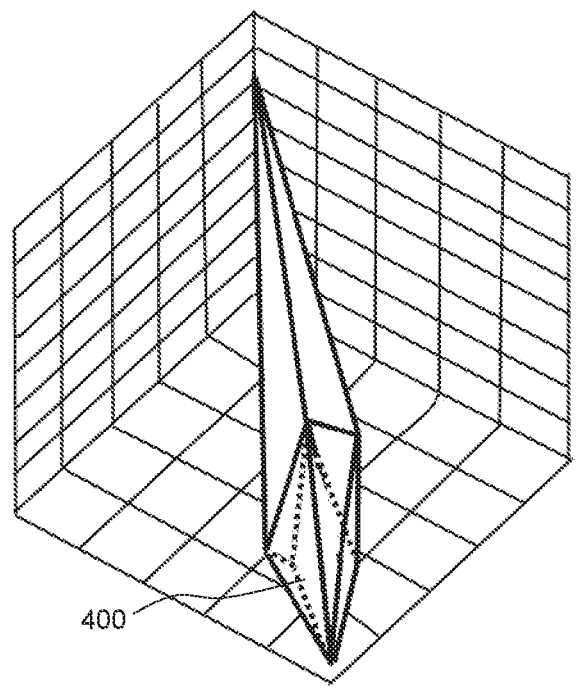

In some examples, as now described in relation to FIGS. 3 and 4, populating a data object, for example as described in block 106, comprises determining a data object comprising an object property volume 300, 400.

In the example of FIG. 3, the object to be represented is a unit-size cube where every [x, y, z] location is assigned a proportional RGB value—resulting in an RGB cube. A three-property object property volume 300 provides an expression of Red, Green and Blue (RGB) color values. The volume 300 comprises a plurality of vertices, each having an associated n-tuple where n is the number of object properties represented thereby. More particularly, in this example, the volume 300 is represented by a cube, with eight units along each length (as each color is defined as an eight bit value) and eight vertices. Each of the eight vertices has a 3-tuple (i.e. n=3) of RGB values associated with it. The volume 300 is subdivided into a plurality of tessellating polytopes 302, which in the example of the Figure are tetrahedra, but could comprise any shape or form. The colors in each tetrahedron 302 may be interpolated based on the RGB values associated with the vertices of that tetrahedron (i.e. while a subset of the object property descriptions-those defining the vertices—are stored explicitly, other object property descriptions may be interpolated therefrom).

The geometry of the object may be represented by a geometric model which is simply a cube represented by eight vertices, while the object properties are represented by eight RGB values assigned to the extreme vertices of the cube. While in this example color is variable, although other properties or combinations of properties could be considered in other examples.

In this example, forming the data object, for example as described in block 106, comprises assigning the eight RGB values to the vertices, as well as defining a tessellation of four tetrahedra such that each of these geometric tetrahedra points to one of four tuples of four RGB values each, thus defining the full scope of an RGB cube.

The address of data indicative of an object property description may be expressed by identifying a polytope 302 and the barycentric coordinates of the object property description within the polytope 302. While the object geometry may be represented in the three dimensional, geometrical object space, locations and/or sub-regions therein may be associated with a location/region within an object property volume 300, and thus an n-tuple of object properties (which may be explicit or interpolated).

The total amount of memory/storage to store the object model is eight RGB values, four object property tetrahedra, a geometric description (which in this example may comprise four geometric tetrahedra), an association between the geometric tetrahedra and each of the eight vertices of the cube.

In the example of FIG. 3, the full range of each colour was included in the object, and the object's geometric shape matched the shape of the volume 300. FIG. 4 shows another example of an object property volume 400 of an arbitrary shape representing a data object. The object property volume 400 represents a plurality of property values defined over its own domain, each value being uniquely represented (for example, each property value providing an indication of a distinct object property or distinct object property set described in received data representing a three-dimensional object). In some examples, object property descriptions may be explicitly defined at all locations. However, in other examples, the object properties may be explicitly defined at a subset, but not all, locations within the volume (for example, at the vertices), and intermediate values may be recovered by interpolation.

In one example, the volume 400 is defined by N vertices and a tessellation, such that the object properties are defined at those N vertices with their tessellation. Intermediate object property descriptions (i.e., object property descriptions which are not at the N vertices) may be determined by interpolation, for example by determining barycentric coordinates within the volume 400 defined by the N vertices and their tessellation.

A sub-region of an object may be associated with a sub-region of the volume 400, for example if transitioning behaviour is defined.

Figure 5:
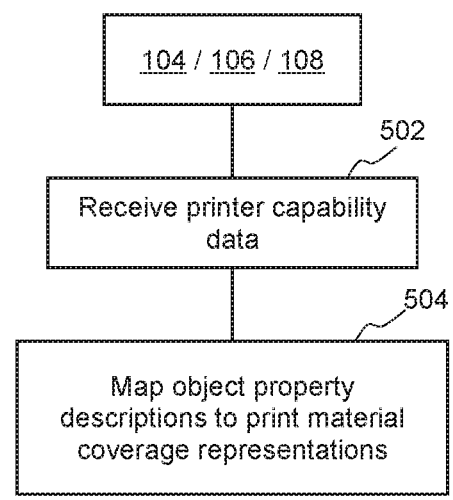
FIG. 5 is a flowchart of an example of a method for mapping object property descriptions to a print material coverage representation.

FIG. 5 shows an example of data mapping between object property descriptions and print material coverage representations. Such data mapping may be carried out at various stages. For example, the data mapping may be carried out after block 104, such that the data object is populated with print material coverage values, or else after block 106, such that the data object is transformed by mapping the distinct object property descriptions in the data object to a print material coverage representation, or the generated representation of a three dimensional object as formed in block 108 may be operated on, either on a location by location basis, or as a whole.

Therefore, the flow chart of FIG. 5 may start with block 104, 106 or 108. In this example, printer capability data is received in block 502. Printer capability data may comprise an indication of the agents and/or build materials available for use at a particular print apparatus, as well as in some examples the resolutions at which the agents may be applied. In such examples, a mapping (block 504) may be based on the printer capability data.

A mapping may for example be made according to data held in a lookup table relating a plurality object property descriptions to a plurality of print material coverage representations such that, when an object is generated using proportions specified in the print material coverage representation, an object having the specified properties is seen. In other examples, individual properties within the descriptions may be mapped separately.

In some examples, as mentioned above, the mappings may take into account any established relationships between locations such that consistent mappings (where more than one mapping option exists) may be made. In such examples, each location may have association not just to data indicative of object properties but also of other locations which are relevant to the mapping which should be applied. In particular, the associated locations may be identified as belonging a geometric sub-portion of the object, which may for example be defined as a tuple [i, j, k, l] defined by reference to four vertices in three dimensional space each with their [x, y, z] coordinates. This information can be held as a parallel geometric tessellation to that which applies to object properties.

In an example, when a location which is within a predetermined sub-portion is to be mapped to the print material coverage domain, a tuple is identified along with associated volumetric-probability transition data, which may for example define or reflect object property transitions or gradients. A consistent mapping may then be used for all locations within the sub-portion. The definition of such a tuple allows the specific geometric relations to be preserved where specified. In some examples, such a sub-portion may be identified by a user, specified in the input data, determined automatically or identified in some other way. This means that even a variation of object properties across such a sub-portion of the object can be efficiently represented and/or effectively reproduced in an object generated using control data generated from the representation of the object.

The result of the mapping may be a data object indicating, for each location, the volumetric probabilities of all print materials to be used (whereby print materials may refer to agents and/or build materials which may be applied at a single print-resolution location in an object to be generated) as well as their structural distribution, and may also comprise print apparatus control data, such as heating parameters, print speed parameters, and the like.

A print material coverage representation value or vector may be associated with a location or to the data object containing the indications of object properties by use of a data tag or the like.

The print material coverage representation of the object may therefore be a data object which is the same size as the data object comprising data indicative of object property descriptions. The print material coverage representation may therefore also benefit from having no repeated entries (i.e. no redundancy). In some cases, it may be that a single print material coverage representation applies to more than one object property description, in which case the entries for the object property description may be considered to be indistinct and may, in some examples be merged.

In some examples, the print material coverage representation may comprise a plurality of possible mappings for a given object property description. For example, it may be that a particular property can be achieved by any one of a number of combinations of agents. In such a case, the plurality of print material coverage representations or mappings for that object property description may be stored as a tuple or the like, meaning that it is larger than the object property domain representation.

In other examples, instead of mapping object property descriptions to a print material coverage representation, they may be mapped directly to control data using predetermined control data for a particular set of object properties.

Figure 6:
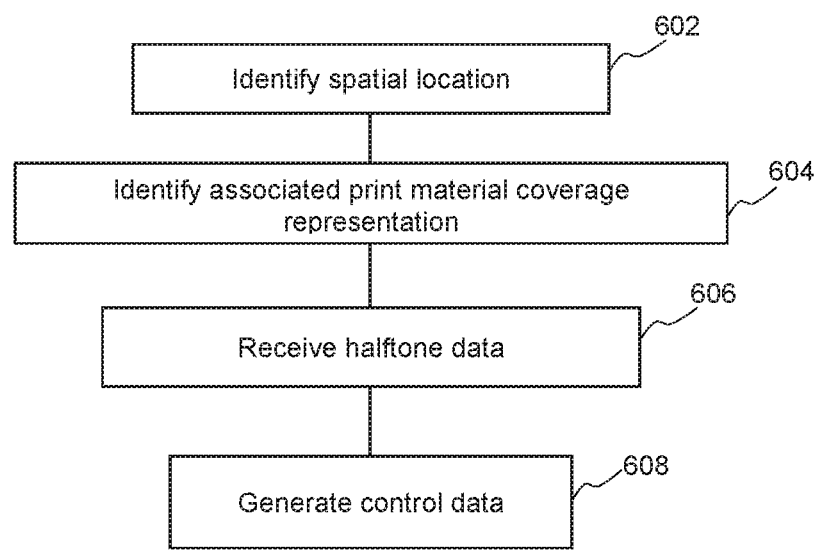
FIG. 6 is a flowchart of an example of a method for generating control data.

FIG. 6 shows an example of a method for generating control data, which in this example is carried out at print-resolution (i.e. at the resolution of a print apparatus to be used to generate a three dimensional object as described by the data).

At block 602, a spatial location (in this example, an [x, y, z] location) at print resolution is identified. The print material coverage representation (for example an Mvoc) identified by a mapping (for example, using the mapping process of FIG. 5) is found (or in some examples interpolated) based on the spatial location (block 604). Halftone data is received in block 606. In one example, a three-dimensional halftone threshold matrix may be used, and the threshold(s) corresponding to the same [x, y, z] location within the matrix may be identified. However, in other examples, halftone data may be supplied in some other way.

Control data is generated by comparing the halftone threshold value(s) with volume coverage data set out in the print material coverage representation (block 608).

As noted above, for some object representations, a subset of object property descriptions are explicitly defined (for example, the vertices of an object property volume). In a first example, interpolated object property descriptions can be determined first in the object property space and then mapped to a print material coverage representation, for example on a voxel-by-voxel, or location-by-location, basis. In a second example, the explicitly subset of defined object property descriptions are mapped to a material print coverage representation first and further print material coverage descriptions interpolated therefrom. In the first example, there are as many object property to print material coverage mappings as there are interpolated object property combinations, while in the second example there are fewer mappings, which may therefore make more economical use of data storage facilities. Some halftoning mechanisms, such as error diffusion, may rely on a pre-computation of the interpolated print material coverage representation data.

Figure 7:
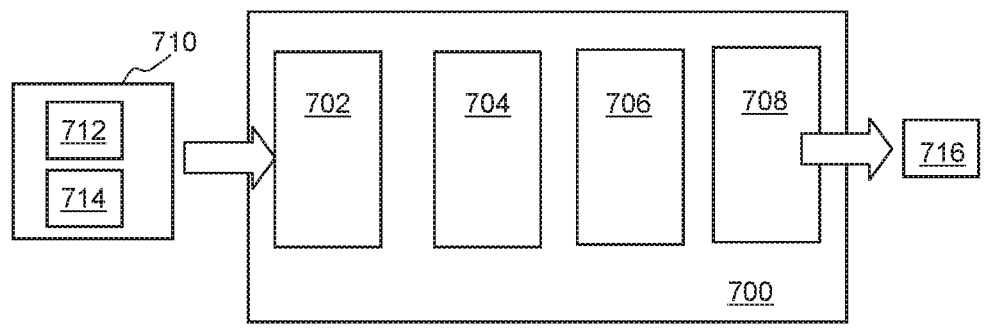
FIG. 7 is a simplified schematic of an example of processing apparatus for representing a three dimensional object.

FIG. 7 shows an example of processing apparatus 700 that may be used to generate control data for production of a three-dimensional object. The apparatus 700 in this example comprises an interface 702, a data analyser 704, a memory 706, and a model generator 708.

In the example of FIG. 7, data representing a three-dimensional model object 710 comprises object model data 712 and object property data 714. The object model data 712 may define a three-dimensional geometric model of at least a portion of the model object 710, including the shape and extent of all or part of an object in a three-dimensional co-ordinate system, e.g. the solid portions of the object. The object model data 712 may be generated by a computer aided design (CAD) application. Object property data 714 defines at least one object property for the three-dimensional object to be generated. In one case, the object property data 714 may comprise a color, flexibility, elasticity, rigidity, surface roughness, porosity, inter-layer strength, density, conductivity and the like for at least a portion of the object to be generated. In one example, it may comprise a plurality of object property description data objects 200 as described in relation to FIG. 2. The object property data 714 may define multiple object properties for a portion or portions of an object.

The interface 702 receives the data 712, 714 representing the three-dimensional model object 710. In some examples, the interface 702 may receive the object model data 712 and the object property data 714 as a single file; in other examples the interface 702 may receive portions of the object model data 712 and/or the object property data 714 as multiple data objects, wherein the object model data 712 and the object property data 714 are distributed across a number of associated data structures. In one example, the object model data 712 may comprise voxels that are defined in a three-dimensional (also referred to herein as [x,y,z]) space. A given voxel may have associated data that indicates whether a portion of the model object 710 is present at that location. The object property data 714 may comprise global and local object property data, e.g. certain object property values as defined in the object property data 714 may be associated with each voxel that defines the object and/or certain object property values may be associated with a set of voxels, e.g. ranging from individual voxels to all voxels associated with the object. In one case, the data representing the three-dimensional object comprises a model of a three-dimensional object that has at least one object property specified at every location within the model, e.g. at every [x, y, z] co-ordinate.

The data analyser 704 identifies distinct object property descriptions and stores these in the memory 706. The memory 706 comprises an addressable memory space and holds data indicative of the distinct object property descriptions. The memory space is therefore holds unique (non-duplicated) object property descriptions (i.e. without repetition or redundancy). In some examples, all stored distinct object property descriptions are stored explicitly, each being held at a different memory address. In other examples, however, a subset of the object property descriptions may be held explicitly, while the transitions between these values may be defined or derivable. For example, the data analyser 704 may define vertices in an object property volume, where distinct object property descriptions are represented within the volume, with the object properties being explicitly defined at the vertices. The data analyser 704 may further determine transitions between the vertices, such that the intermediate values providing the complete set of distinct object property value descriptions can be recovered by interpolation from the values providing the descriptions held for the vertices.

The model generator 708 generates a data model 716 representing the object, the data model comprising an association between a geometric description of each voxel and a memory address indicating the location of the data indicative of the object property description for that voxel. In this example the object property description itself is stored in the memory 706. The data model 716 may therefore comprises a geometrical description of the three dimensional object, defining a plurality of locations within the three dimensional object wherein each location is associated with a unique memory address of the addressable memory space, and at least one of the unique memory addresses is associated with a plurality of locations.

Figure 8:
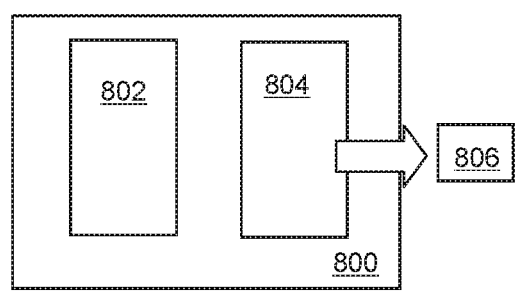
FIG. 8 is a simplified schematic of an example of processing apparatus for generating control data for production of a three-dimensional object.

FIG. 8 shows additional processing apparatus 800, which could be in included in the processing apparatus of FIG. 7 in some examples. The processing apparatus 800 comprises a mapping module 802 to map the data indicative of the object property descriptions to a print material coverage representation and a control data module 804 to generate control data from the print material representation.

In this example, the mapping module 802 receives the data object held in the memory 704 and maps each (unique) entry therein to at least one print material representation, in this example, at least one material volume coverage (Mvoc) vector. In some examples, as noted above, not all object property descriptions are provided explicitly. In such examples, object property descriptions may be determined by interpolation of the explicitly held object property descriptions prior to mapping, and/or print material representations may be interpolated from determined print material representations generated for the explicitly defined object property descriptions.

An Mvoc vector may have a plurality of values, wherein each value defines a proportion for each, or each combination of print materials in an addressable location of a layer of the three-dimensional object. For example, in an additive manufacturing system with two available print materials (for example, agents)—M1 and M2, where each print material may be independently deposited in an addressable area of a layer of the three-dimensional object, there may be $2^2$ (i.e. four) proportions in a given Mvoc vector: a first proportion for M1 without M2; a second proportion for M2 without M1; a third proportion for an over-deposit (i.e. a combination) of M1 and M2, e.g. M2 deposited over M1 or vice versa; and a fourth proportion for an absence of both M1 and M2. In this case an Mvoc vector may be: [M1, M2, M1M2, Z] or with example values [0.2, 0.2, 0.5, 0.1]—i.e. in a given [x, y] location in a z slice, 20% M1 without M2, 20% M2 without M1, 50% M1 and M2 and 10% empty. As each value is a proportion and the set of values represent the available material combinations, the set of values in each vector sum to 1 or 100%.

For example, in a case where the agents are colored, then the Mvoc vector may be determined to select agent combinations that generate a match with a supplied object property, e.g. a supplied RGB value.

The control data module 804 operates on the print material coverage representation using halftone data, in one example having at least one stored halftone threshold matrix having the same dimensions as specified for the object 710. Specifically, in this example, the print material coverage representation is compared with the threshold values of the threshold matrix representing the same three-dimensional location to generate control data 806 for printing a three-dimensional object based on the model object. The control data 806 may for example be in the form of a set of discrete print material choices for a pixel in a plane, wherein the discrete values across the area of the plane may be representative of proportions set out in the print material coverage representation.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, such the processing apparatus 700, 800 may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a feature or block from one example may be combined with or substituted by a feature/block of another example The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
receiving data representing a three-dimensional (3D) object, the data representing the 3D object comprising geometric description data of voxels of the 3D object and a plurality of object property descriptions describing properties of the voxels of the 3D object;
identifying a subset of the plurality of object property descriptions that contains distinct, non-duplicated object property descriptions of the 3D object;
storing the distinct, non-duplicated object property descriptions of the 3D object in a memory, wherein each of the distinct, non-duplicated object property descriptions is stored at one of a plurality of different addresses of the memory; and
generating a data model to be used to produce the 3D object, the data model comprising the geometric description data of the voxels of the 3D object and data object addresses associated with the voxels of the 3D object, wherein each of the data object addresses is associated with one voxel of the voxels and identifies one of the plurality of different addresses of the memory where the distinct, non-duplicated object property description of the voxel is stored.

2. The method according to claim 1, further comprising determining an association between the distinct, non-duplicated object property descriptions for a plurality of locations of the voxels in the 3D object.

3. The method according to claim 1, further comprising mapping each of the distinct, non-duplicated object property descriptions to a print material coverage representation that specifies a volume of a print material to be applied at one of the voxels.

4. The method according to claim 1, wherein the geometric description data of the voxels of the 3D object includes data identifying a plurality of locations of the voxels within the 3D object.

5. The method according to claim 1, wherein each of the distinct, non-duplicated object property descriptions comprises an n-tuple, where n is a total number of different object properties described in the distinct, non-duplicated object property description.

6. The method according to claim 1, wherein a total number of the distinct, non-duplicated object property descriptions in the subset of the distinct, non-duplicated object property descriptions is less than all of the distinct, non-duplicated object property descriptions in the data representing the 3D object, and wherein other distinct, non-duplicated object property descriptions that are not included in the subset are derivable by interpolation of the distinct, non-duplicated object property descriptions in the subset.

7. The method according to claim 1, wherein the distinct, non-duplicated object property descriptions of the 3D object include descriptions of color, transparency, flexibility, or rigidity of print materials to be used to produce the 3D object.

8. The method according to claim 1, further comprising:
receiving printer capability data of a 3D printer; and
mapping the distinct, non-duplicated object property descriptions of the 3D object to print material coverage representations based on the printer capability data of the 3D printer, wherein the print material coverage representations indicate specific amounts of print materials to be used at the voxels of the 3D object.

9. A processing apparatus, comprising:
an interface to receive data representing a three-dimensional (3D) object, the data representing the 3D object comprising geometric description data of voxels of the 3D object and a plurality of object property descriptions describing properties of the voxels of the 3D object;
a processor; and
a non-transitory computer readable medium storing instructions that when executed cause the processor to:
identify a subset of the plurality of object property descriptions that contains distinct, non-duplicated object property descriptions of the 3D object;
store the distinct, non-duplicated object property descriptions of the 3D object in a memory, wherein each of the distinct, non-duplicated object property descriptions is stored at one of a plurality of different addresses of the memory; and
generate a data model representing the 3D object, the data model comprising the geometric description data of the voxels of the 3D object and data object addresses associated with the voxels of the 3D object, wherein each of the data object addresses is associated with one voxel of the voxels and identifies one of the plurality of different addresses of the memory where the distinct, non-duplicated object property description of the voxel is stored.

10. The processing apparatus according to claim 9, wherein the instructions further cause the processor to: map the distinct, non-duplicated object property descriptions of the 3D object to print material coverage representations that indicate specific amounts of print materials to be used at the voxels of the 3D object.

11. The processing apparatus according to claim 10, wherein the instructions further cause the processor to: generate control data from the print material coverage representations.

12. The processing apparatus according to claim 9, the distinct, non-duplicated object property descriptions of the 3D object include descriptions of color, transparency, flexibility, or rigidity of print materials to be used for producing the 3D object.

13. A non-transitory computer readable medium storing instructions that, when executed by a processor, cause the processor to:
receive data representing a three-dimensional (3D) object, the data representing the 3D object comprising a plurality of object property descriptions describing properties of the voxels of the 3D object;
identify a subset of the plurality of object property descriptions that contains distinct, non-duplicated object property descriptions of the 3D object;
store the distinct, non-duplicated object property descriptions of the 3D object in a memory, wherein each of the distinct, non-duplicated object property descriptions is stored at one of a plurality of different addresses of the memory; and
generate a data model representing the 3D object, the data model comprising a geometrical description of the voxels of the 3D object and data object addresses associated with the voxels of the 3D object, wherein each of the data object addresses is associated with one voxel of the voxels and identifies one of the plurality of different addresses of the memory where the distinct, non-duplicated object property description associated with the voxel is stored.

14. The non-transitory computer readable medium according to claim 13, wherein each of the distinct, non-duplicated object property descriptions comprises an n-tuple, where n is a total number of different properties described in the distinct, non-duplicated object property description.

15. The non-transitory computer readable medium according to claim 13, wherein a total number of distinct, non-duplicated object property descriptions in the subset is less than all of the distinct, non-duplicated object property descriptions in the data representing the 3D object, and wherein other distinct, non-duplicated object property descriptions that are not included in the subset are derivable by interpolation of the distinct, non-duplicated object property descriptions in the subset.

* * * * *